United States Patent [19]

Fricker et al.

[11] Patent Number: 4,878,640

[45] Date of Patent: Nov. 7, 1989

[54] TOOTHED ANCHORING RAIL

[75] Inventors: Siegfried Fricker, Str. 30-34, 7135 Wiernsheim; Klaus Eröhlich, Pforzheim, both of Fed. Rep. of Germany

[73] Assignee: Siegfried Fricker, Wiernsheim, Fed. Rep. of Germany

[21] Appl. No.: 146,515

[22] Filed: Jan. 21, 1988

[30] Foreign Application Priority Data

Jan. 21, 1987 [DE] Fed. Rep. of Germany ....... 3701530

[51] Int. Cl.⁴ .............................................. E04B 1/41
[52] U.S. Cl. ............................. 248/297.2; 248/297.3; 248/500
[58] Field of Search .................. 248/500, 297.2, 297.3, 248/245; 411/84, 85, 107, 112

[56] References Cited

U.S. PATENT DOCUMENTS

| | | | |
|---|---|---|---|
| 2,737,268 | 3/1956 | Smith | 248/245 Y |
| 3,078,484 | 2/1963 | Briggs | 248/297.3 X |
| 3,322,177 | 5/1967 | Phelan | 411/84 X |
| 4,545,697 | 10/1985 | Verdenne | 411/85 X |
| 4,705,327 | 11/1987 | Bollman | 299/297.2 |

FOREIGN PATENT DOCUMENTS

| | | | |
|---|---|---|---|
| 40180 | 5/1980 | European Pat. Off. | 240/297.3 |
| 631300 | 12/1927 | France | 248/245 |

*Primary Examiner*—Alvin C. Chin-Shue
*Attorney, Agent, or Firm*—Becker & Becker, Inc.

[57] ABSTRACT

An anchoring rail that includes a hollow section which is provided with a slot that extends in the longitudinal direction, with each of the sides of the slot being provided with a toothing that is engaged by a corresponding toothing on a latching plate that is wider than the slot and is part of a mounting element. In order to increase the capacity of the mounting element to take up loads applied in the longitudinal direction of the anchoring rail, without the mounting element being displaced, the load-carrying surfaces of the toothings, which are in contact with each other in the longitudinal direction of the anchoring rail, are oriented at right angles to the plane defined by the slot.

4 Claims, 5 Drawing Sheets

TOOTHED ANCHORING RAIL

BACKGROUND OF THE INVENTION

The present invention relates to an anchoring rail that includes a hollow section which is provided with a slot that extends in the longitudinal direction of the hollow section, with each edge that forms a side of the slot being provided with a toothing that is engaged by corresponding toothings provided on a latching plate which is wider than the slot and is part of a mounting element, with the latching plate being capable of being secured in its engaged position by a threaded bolt.

Commercially available anchoring rails are known that consist of a hollow section of rectangular cross section and are provided with a longitudinal slot for inserting mounting elements. The free ends of the arms that form the slot are bent inward into the hollow section and are parallel to each other. These ends face the bottom of the hollow section, and their edges are each provided with a toothing that is open toward the bottom of the hollow section. The mounting element, in the form of a threaded bolt, is provided with corresponding toothing on that side thereof that faces the threaded shaft. The hammer head of the bolt is inserted through the slot into the hollow section, is rotated by 90° into a position in which the teeth can engage, and is tightened by means of a nut. The toothing provided on the hammer head engages the corresponding toothing of the arms that define the slot, with the teeth being pressed together as the nut is tightened.

The load-carrying surfaces of the teeth are in contact with each other in the longitudinal direction of the anchoring rail and intersect at an acute angle the plane of the slot, with the result that forces that act on the bolt in the longitudinal direction of the anchoring rail produce stresses, in the screwed connection, that act in the axial direction of the bolt. It has been found that such anchoring rails with mounting elements latched in this manner are capable of taking up large loads that act transversely or vertically on the anchoring rail, but that heavy loads in the longitudinal direction of the anchoring rail may cause the mounting element to slide in the longitudinal direction of the slot. Accordingly, loads acting in the longitudinal direction of the anchoring rail that can be taken up are smaller than loads acting transversely or vertically on the anchoring rail.

It is an object of the present invention to provide a suitable design of the anchoring rail and mounting element so that essentially equal loads acting transversely, vertically, or longitudinally on the anchoring rail can be taken up without dislocating the mounting element.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The anchoring rail of the present invention is characterized primarily in that the load-carrying surfaces of the toothings, which are in contact with one another in the longitudinal direction of the anchoring rail, are oriented at right angles to the plane defined by the slot. Since the load-carrying surfaces are disposed at right angles with respect to the plane of the slot, forces acting on the mounting element in the longitudinal direction of the anchoring rail do not produce any component that acts at right angles to the plane of the slot and which might tend to loosen the toothing.

The individual teeth of the toothings always fully engage the tooth gaps of the opposite toothing to their entire depth—irrespective of loading—thus over a large contact area ensuring a form-fit that is capable of taking up large forces acting in the longitudinal or transverse axis of the anchoring rail.

Pursuant to a further development of the present invention, the toothing of the anchoring rail is provided in the plane of the slot, i.e. in a side plane of the rectangular hollow section that forms the anchoring rail, in the two arms that define the slot. Accordingly, the teeth of each toothing face the teeth of the opposite toothing; toothing and mating toothing are in one plane in their engaged position. This design ensures simple manufacture with few manufacturing steps, and provides an anchoring rail of low height that is also capable of taking up heavy loads acting on the mounting element in the longitudinal direction of the anchoring rail. The sides of the teeth are preferably oriented at right angles to the longitudinal axis of the anchoring rail, so that in the plane of the slot they have a rectangular cross section. However, the teeth may also have the shape of saw teeth, with a triangular cross section.

Large load-carrying surfaces can be obtained by designing the teeth as individual triangles whose bases adjoin each other.

Easier mating of toothing and cooperating toothing is achieved by slightly tapering, bevelling, or rounding off the facing edges of the teeth on the latching plate (i.e. screw bolt) and on the anchoring rail.

A particularly expedient embodiment of the present invention, that is independent of shape and position of the teeth, provides for the toothing on the mounting element, in particular on the head of a bolt or on a plate or the like associated with a bolt, to be offset eccentrically by one half of a tooth pitch from the axis of the bolt. This offset toothing makes it possible to reduce the tooth pitch by one half by simply rotating the bolt by 180°, thus making it possible, by simple means, a correspondingly finer adjustment of the mounting element in the longitudinal direction of the anchoring rail. Similarly, if a latching plate is used, simple rotation of the latter by 180° makes it possible to achieve displacement by only one half tooth pitch in the longitudinal direction of the anchoring rail, with respect to the original position. In contrast, the known state of the art permits displacement in steps of only one full tooth pitch in the longitudinal direction of the anchoring rail.

Further features of the present invention will be described in detail subsequently.

DESCRIPTION OF PREFERRED EMBODIMENTS

Figure 1:
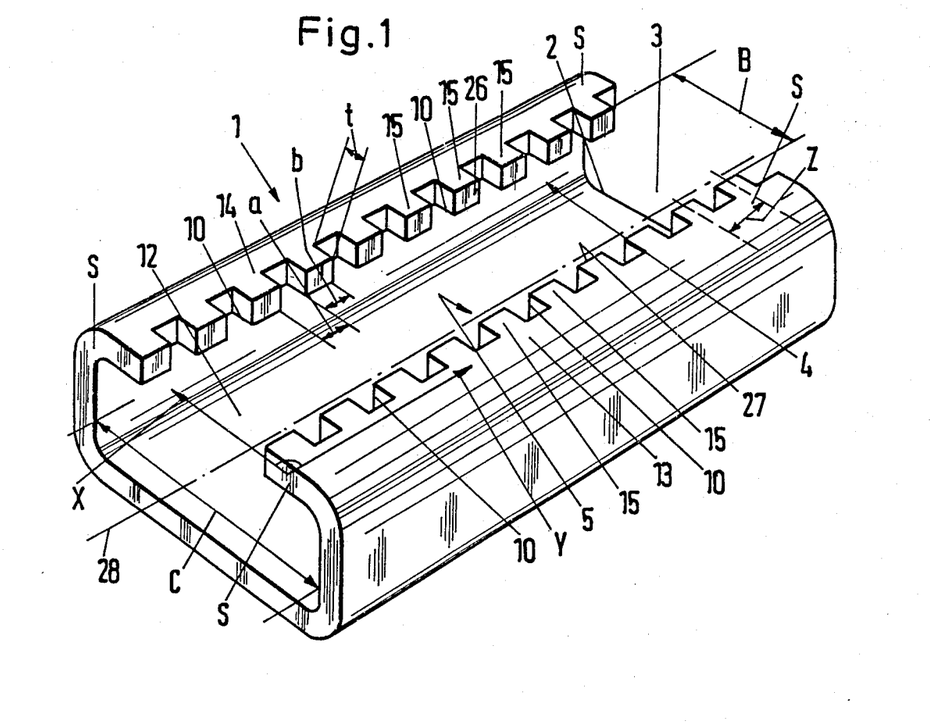
FIG. 1 is a perspective view of a first embodiment of the anchoring rail according to the present invention.

Referring now to the drawings in detail, FIG. 1 is a perspective view of an anchoring rail 1 that is formed from a hollow steel section 2 of approximately rectangular cross section. A continuous slot 3 that extends in the longitudinal direction of the anchoring rail 1 is provided in one of the wider sides S; the width B of the slot 3 is less than the width of the side S. Two arms 13, 14 remain at both sides of the slot 3; the arms are disposed in the plane x, y of the sides of the hollow section or in the plane 12 of the slot 3.

Teeth 15 are machined in the edges 26, 27 of both arms, for example by pressing-in or by punching. The teeth 15 have the shape of rectangular cubes or cuboids that in the longitudinal direction of the anchoring rail 1 are spaced at a distance "a" from each other; this distance corresponds to the width "b" of the teeth, with both "a" and "b" being measured in the direction of the longitudinal axis 28 of the rail 1. The thus-formed toothing 4 at the edge 26 of one arm is symmetrical to the toothing 5 at the edge 27 of the other arm, with respect to the longitudinal center line of the slot 3.

Figure 2:
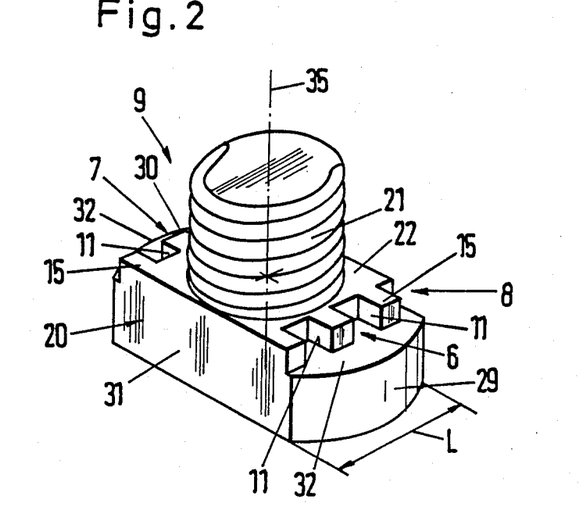
FIG. 2 is a perspective view of a bolt associated with the anchoring rail shown in FIG. 1.

FIG. 2 shows the mounting element that is to be inserted in the anchoring rail 1. This mounting element comprises a threaded bolt 9 that has a latching plate 8 integrated in its head. The hammer head 20 of the bolt 9 has an approximately rectangular shape with rounded narrow sides 29, 30, with the length L of the narrow sides being equal to or smaller than the width B of the slot 3. The wide sides 31 of the hammer head 20 are longer than the width B of the slot 3, but are somewhat shorter than the internal width C of the hollow section 2 that forms the anchoring rail 1.

The latching plate 8 is machined in that base side 22 of the hammer head 20 that faces the threaded shaft 21. A respective recess or shoulder 32 that is open towards the narrow side 29 or 30 is provided with toothing 6 or 7 on each narrow side of the hammer head 20; the toothing 6, 7 corresponds to the toothing 4, 5 of the anchoring rail 1. The toothings 6 and 7 of the latching plate 8, which is integrated with the hammer head 20, lie in a common plane that is oriented at right angles with respect to the longitudinal central axis 35 of the threaded shaft 21. The distance between the toothings 6 and 7, as measured in the direction of the wide side 31 of the hammer head 20, corresponds to the distance between the toothings 4 and 5 of the anchoring rail 1 as measured in the transverse direction of the latter.

This adaptation or coordination of the threaded bolt 9 to the dimensions and toothings of the anchoring rail 1 makes it possible to insert the hammer head 20, by its narrow side, through the slot 3 and into the hollow section 2. When the bolt 9 is rotated by 90°, its hammer head 20 is positioned beneath the arms 13 and 14. In this position, the toothings 6 and 7 in the hammer head 20 face the toothings 4 and 5 in the anchoring rail, with toothing 6 engaging toothing 4 and toothing 7 engaging toothing 5 when the bolt 9 is moved axially out of the anchoring rail 1. The teeth 15 of one of the toothings (for example the toothing 4) engage the mating toothing (for example 6) along the entire tooth depth "t", as a result of which contact over a large area is ensured between the latching plate 8 and the anchoring rail 1. In the longitudinal direction of the anchoring rail 1, the teeth 15 of the toothings 4, 5, 6, 7 contact one another via their load-carrying surfaces 10, 11, with all of the load-carrying surfaces 10, 11 being oriented at right angles to the plane 12 of the slot 3. Accordingly, forces that act on the bolt 9 in the longitudinal direction of the anchoring rail 1 are transferred directly to the anchoring rail 1 by the interengaging toothings 4–7 without applying any load to the screwed connection between the bolt 9 and the anchoring rail 1 that would tend to loosen the screwed connection. Forces that act on the bolt 9 in the transverse direction or in the vertical direction of the anchoring rail are transferred directly to the anchoring rail itself. In the illustrated exemplary embodiment, the latched-in threaded bolt forms a common plane with the teeth of the anchoring rail contributing to the high load carrying capacity in all directions. Accordingly, the latching plate 8, with its toothings 6, 7, is completely disposed within the slot 3 and fills the latter in such a manner that, with the head of the bolt or a similar mounting element inserted, the wider side S of the anchoring rail is closed by a planar surface.

It is particularly expedient with any type of toothing—including the types of toothing known in the state of the art—to arrange the toothing in such a way that the toothings 6, 7 on the mounting element, e.g. on the threaded bolt 9, are offset by one half of the tooth spacing or pitch Z with respect to the toothings 4, 5 in the edges of the arms 13, 14 of the anchoring rail 1, i.e. to arrange them eccentrically with respect to axis 35 of bolt 9. This makes it possible to displace the bolt 9 by one half of the tooth pitch in the longitudinal direction of the anchoring rail 1 by simply rotating the bolt by 180°, so that the position of the bolt along the anchoring rail 1 can be more finely adjusted.

Figure 3:
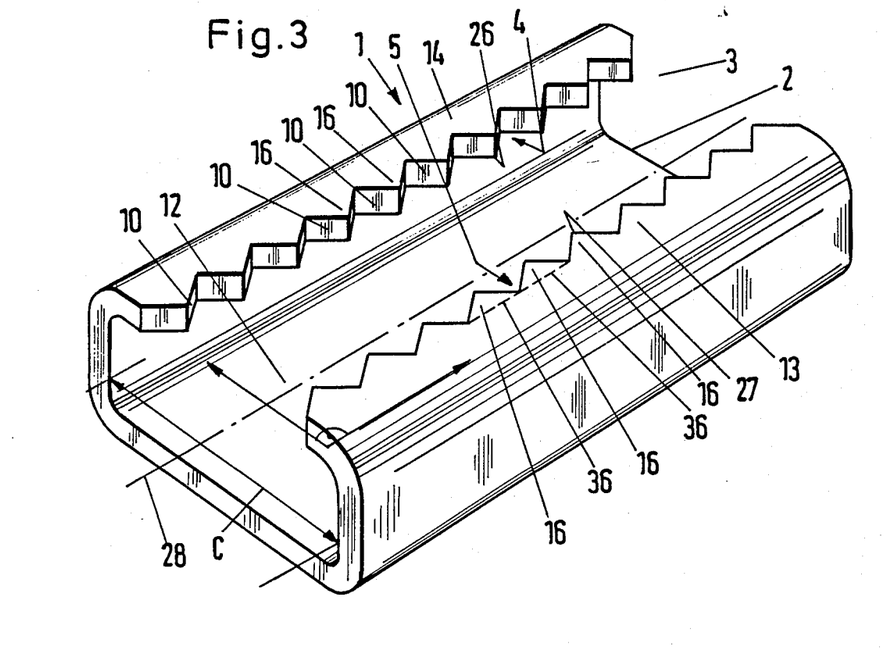
FIG. 3 is a perspective view of a second embodiment of the anchoring rail according to the present invention.
Figure 4:
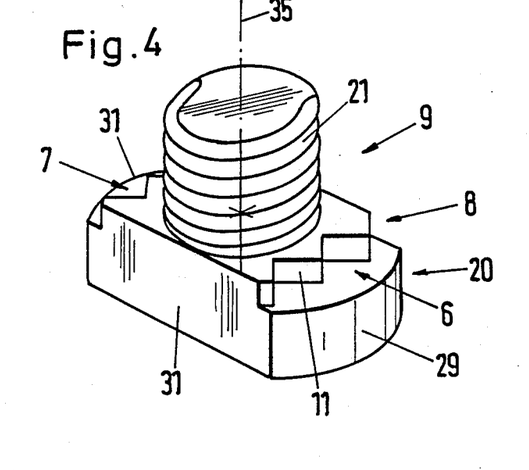
FIG. 4 is a perspective view of a bolt associated with the anchoring rail shown in FIG. 3.

The embodiment of the anchoring rail 1 and the bolt 9 shown in FIGS. 3 and 4 corresponds to that in FIGS. 1 and 2 except for the shape of the teeth. In contrast to the teeth in the latter, each tooth 16 has the shape of a triangle, preferably of an isosceles triangle. The bases 36 of the triangles adjoin each other, so that a plan view of each of the toothings 4, 5 or of each of the edges 26, 27 of the arms of the anchoring rail 1 shows a zig-zag line. Also in this embodiment, the load-carrying surfaces 10, 11 in the anchoring rail 1 and in the head of the bolt 9 are oriented at right angles to the plane 12 of the slot 3, whereas they form equal obtuse angles between each other. In contrast, in the embodiment of FIGS. 1 and 2 the load-carrying surfaces are at right angles.

Figure 5:
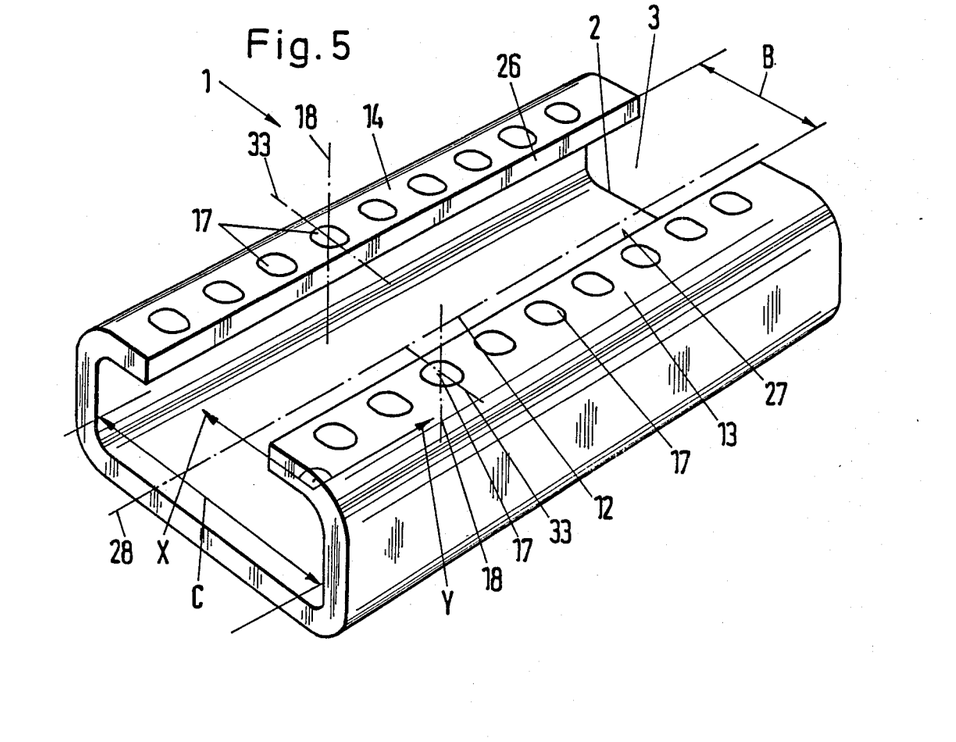
FIG. 5 is a perspective view of a third embodiment of an anchoring rail according to the present invention.
Figure 6:
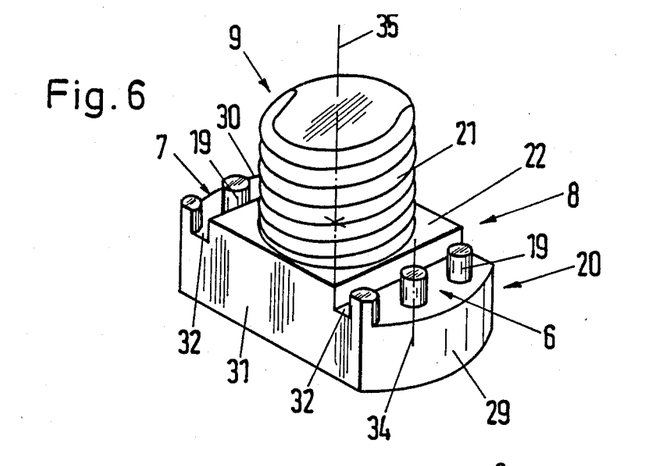
FIG. 6 is a perspective view of a bolt associated with the anchoring rail shown in FIG. 5.

In the embodiment illustrated in FIGS. 5 and 6, the toothings 4–7 are formed by holes 17 in the arms 13, 14 at both sides of slot 3, and by pins 19 on that base side 22 of the hammer head 20 that faces the threaded shaft 21. The holes 17 in the arms 13, 14 are approximately oval in plan view, with their longer axes 33 (greatest width) extending transversely with respect to the anchoring rail 1, and with their bore axes 18 extending at right angles to the plane 12 of the slot 3, as defined by the two arms 13 and 14.

The threaded bolt (FIG. 6) associated with the anchoring rail 1 shown in FIG. 5 has dimensions corresponding to those shown in FIG.'s 2 and 4. A respective shoulder 32 that is open towards the narrow side is provided on each narrow side 29, 30 of that base side 22 of the hammer head 20 that faces the threaded shaft 21. The distance between the bases of the shoulders 32 that face away from each other is no greater than the width B of the slot 3 in the anchoring rail 1. The base of each shoulder 32 is provided with pins 19, the axes 34 of which are oriented parallel to the longitudinal center line 35 of the threaded bolt 9. The pins 19 are preferably provided with tapered tips, and have a circular cross section with an external diameter that is equal to or smaller than the smallest width of the oval-shaped holes 17 in the anchoring rail 1.

After insertion of the threaded bolt 9 in the manner described above, the pins 19 sit with formfit in the holes 17 and hold the bolt 9 which, as in the other embodiments, is secured in the engaged position by a nut or the like. In this embodiment also, the load-carrying surfaces of the toothings are vertical to the plane 12 of slot 3, which ensures support of the threaded bolt 9 free from any axial forces that may loosen the screwed connection. Here too, the latch plate 8 closes the slot 3 in the transverse direction of the anchoring rail 1, which ensures that equal loads can be taken up in all directions.

Figure 7:
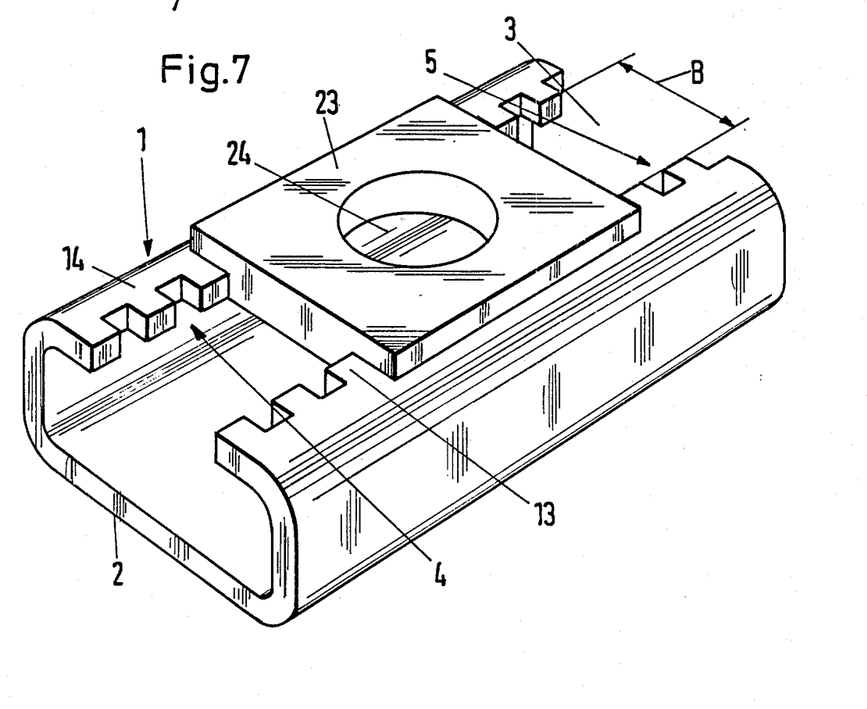
FIGS. 7, 7a, 7b are views that show an anchoring rail according to FIG. 1 with associated latching plate and a simple bolt.
Figures 7A, 7B:
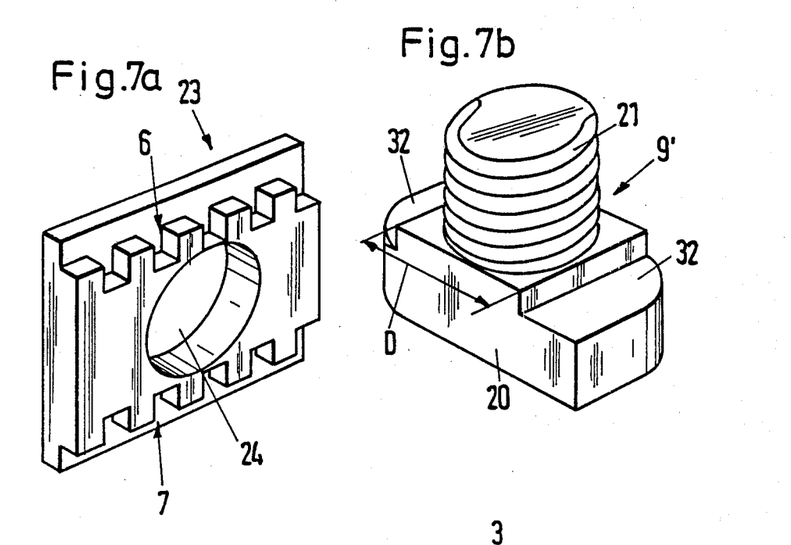

The embodiment shown in FIGS. 7, 7a, and 7b is an anchoring rail 1 of the type shown in FIG. 1. Also the threaded bolt 9' corresponds to that shown in FIG. 2, except that it is not toothed. A separate latch plate 8, designed as the intermediate plate 23, is provided for the purpose of inserting and securing a mounting element. A central hole 24 in the intermediate plate 23 serves for taking up the threaded bolt 9. The length and width of the intermediate plate 23 are greater than the width of the slot 3 in the anchoring rail 1. Respective toothings 6, 7 that correspond to the toothings on the anchoring rail 1 are provided on each longer side of one base side of the intermediate plate 23, with the toothings 4 to 7 corresponding to those shown in FIGS. 1 and 2.

When connecting a mounting element with the anchoring rail 1, the hammer head 20 of the threaded bolt 9' is first inserted through the slot into the hollow section 2 and is then aligned transversely to the anchoring rail so that the arms 13, 14 rest on the shoulders 32 of the hammer head 20. The distance D between the vertical ends of the shoulders 32 corresponds to the width B of the slot 3. The hole 24 of the intermediate plate 23 is then placed over the threaded shaft 21, and the toothings 6, 7 are made to engage the mating toothings 4, 5 of the anchoring rail 1. After screwing-on a nut—not shown here—which secures the intermediate plate 23 in its engaged position, the threaded bolt 9' is now connected with the anchoring rail 1 in such a manner that it is capable of taking up forces.

Figure 8:
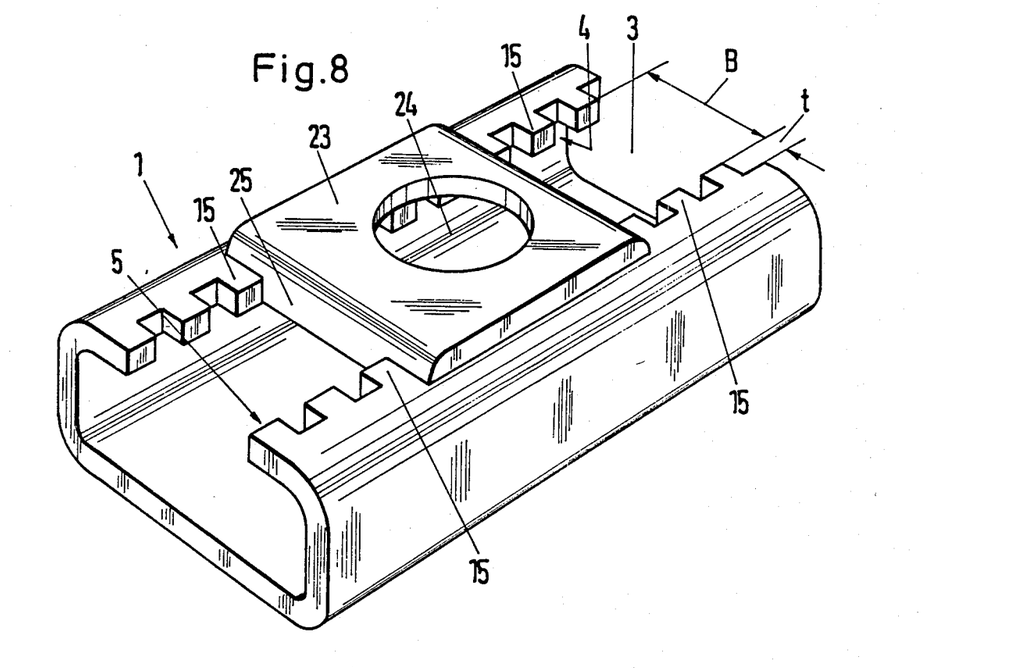
FIGS. 8, 8a, 8b are views that show an anchoring rail according to FIG. 1 with a different embodiment of an associated latching plate and a non-toothed bolt.
Figure 8A:
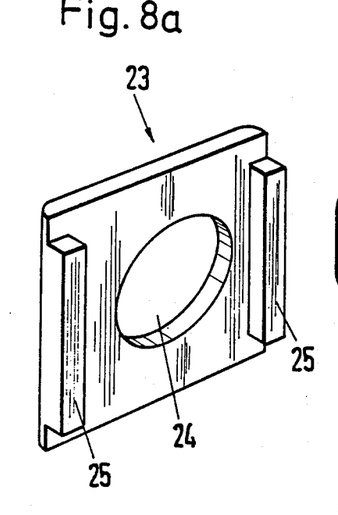
Figure 8B:
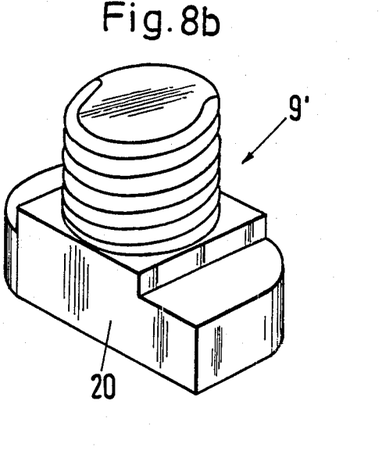

The embodiment shown in FIGS. 8, 8a, 8b corresponds to that shown in FIGS. 7, 7a, 7b with the exception of the intermediate plate 23. The latter has an approximately square shape, with the length of its sides being greater than the width B of the slot 3. Respective bar-shaped teeth 25 are provided along the two opposite edges of the bottom side of the intermediate plate 23, with the length of said bar teeth 25 corresponding approximately to the width B of the slot 3 plus twice the tooth depth "t" (FIG. 1). In the engaged position of the intermediate plate 23, the ends of the bar teeth 25 are oriented transversely to the anchoring rail 1 and their ends lie between the teeth 15. In the embodiment shown in FIGS. 8, 8a, 8b, it is necessary to symmetrically arrange the toothings 4 and 5 with respect to the longitudinal center line of the slot 3.

In order to achieve better engagement of the teeth in the tooth gaps, it is expedient to give the teeth a slightly conical shape—similar to that of the teeth of a gear wheel—so that the teeth are wider at their root than as their tip. This is easy to achieve during punching or pressing of the toothing. Furthermore, the edges of the teeth that face each other can be rounded. Such rounded edges also offer advantages for the embodiments shown in FIGS. 1 to 4.

Figure 9:
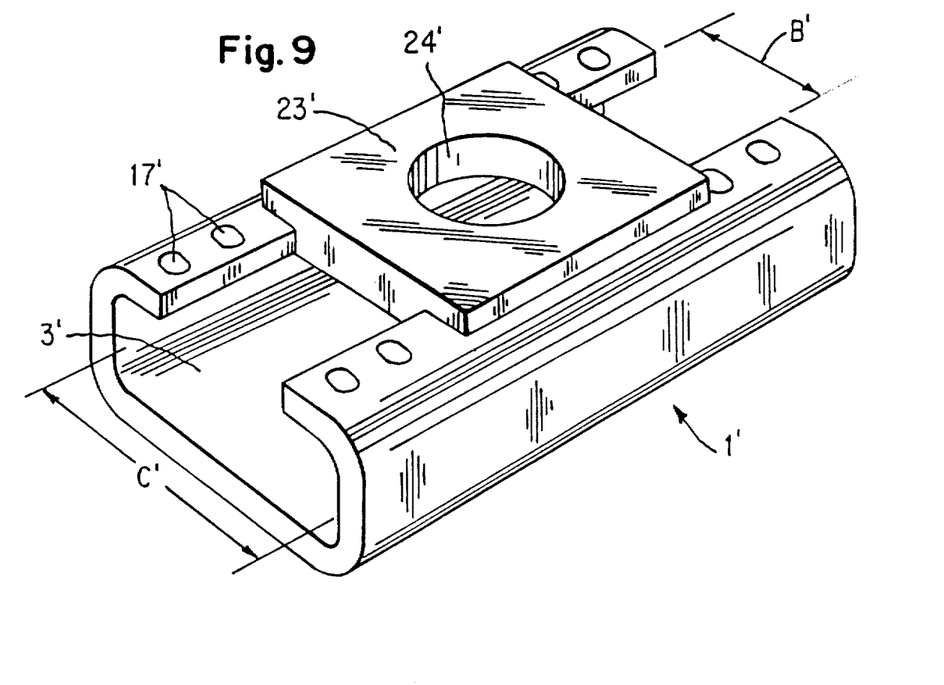
FIGS. 9, 9a, 9b are views that show an anchoring rail like that of FIGS. 5 and 6 as well as like that of FIGS. 7, 7a, 7b.
Figure 9A:
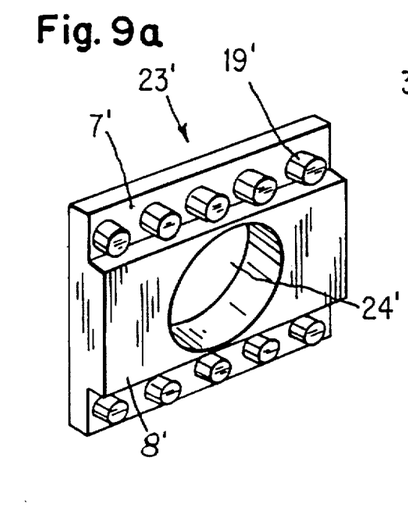
Figure 9B:
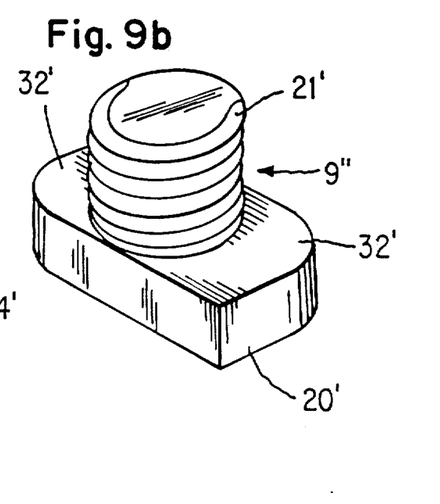

FIGS. 9, 9a, 9b show the embodiment of FIGS. 5 and 6 with the pins and holes as well as the embodiment of FIGS. 7, 7a, 7b with the intermediate plate and threaded bolt, including parts identified by reference numerals to which a prime (') has been added respectively.

The design according to the present invention provides an anchoring rail with very strong toothing in which the teeth on the anchoring rail and on the mounting element make it possible to take up equal loads acting in all directions, in particular also in the longitudinal direction. The design according to the present invention does not only ensure better form-fit engagement of the teeth, but also permits achieving of a smaller height of the anchoring rail compared with the known state of the art, with the inventive toothing being oriented at right angles to the axis of the threaded bolt rather than in the direction of the bolt; this also results in less exposure of the toothing to dirt. In addition, toothing having teeth disposed in a single horizontal plane is easier to manufacture than was the case with the known anchoring rail.

The present invention is, of course, in no way restricted to the specific disclosure of the specification and drawings, but also encompasses any modifications within the scope of the appended claims.

What we claim is:

1. An anchoring rail for use with a mounting element and having a substantially rectangular hollow shape in cross section at right angles to a longitudinal axis of the anchoring rail and one side of the anchoring rail having arm edges defining a longitudinal slot of which a width is smaller than the width of the hollow shape cross section;
   a fastening element inserted in an interior of the hollow anchoring rail and being shiftable in a longitudinal direction of the anchoring rail;
   said fastening element including a threaded bolt having a widened head portion of which the width is greater than the width of the longitudinal slot;
   a latching plate arranged and associated with the fastening element;
   said latching plate having a width which is equally as large as the width of said longitudinal slot and on a side of said widened head toward a threaded shaft of said fastening element at oppositely located narrow sides of said widened head respectively said widened head portion having engagement surfaces in the form of recessed shoulders offset in level as to said latching plate and on opposite sides of said latching plate, which engagement surfaces lie deeper than said latching plate;
   said engagement surfaces being located in the same plane and lying in an engagement position of the fastening element on an inner surface of said anchoring rail arm edges;
   said engagement surfaces having multiple pins arranged at right angles to each engagement surface and projecting in a same direction as said threaded shaft and located in the longitudinal direction of the anchoring rail and arranged respectively in two rows located opposite to each other;

a row of holes closed in a peripheral/circumferential direction in both said arm edges of said anchoring rail and in longitudinal spacing similar to that of said pins, each of said holes having axes at right angles to the arm edges;

said pins engaging positively in the holes in the engagement position of said fastening element; and said latching plate being located in said latter position in the longitudinal slot in such a manner that said latching plate bridges spacing between said arm edges of said anchoring rail.

2. An anchoring rail according to claim 1, in which said latching plate and said head of said screw bolt are embodied unitary and integral with each other.

3. An anchoring rail and mounting element combination according to claim 1, in which said pins are round and have a given diameter, and in which said holes have at least one dimension that is greater than said diameter of said pins.

4. An anchoring rail and mounting element combination according to claim 3, in which each of said pins has a tapered end.

* * * * *

UNITED STATES PATENT AND TRADEMARK OFFICE
CERTIFICATE OF CORRECTION

PATENT NO. : 4,878,640

DATED : November 7, 1989

INVENTOR(S) : Siegfried Fricker et al

It is certified that error appears in the above-identified patent and that said Letters Patent is hereby corrected as shown below:

The drawing sheet containing Figs. 9, 9a and 9b as attached is hereby incorporated as a part of this patent.

Signed and Sealed this

Fifteenth Day of May, 1990

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,878,640

DATED : 7 November 1989

INVENTOR(S) : Siegfried Fricker et al

It is certified that error appears in the above-identified patent and that said Letters Patent is hereby corrected as shown below:

On the title/abstract page, please correct the spelling of the inventor's name as follows:

[75] the second inventor is Klaus Fröhlich

Signed and Sealed this

Thirtieth Day of October, 1990

Attest:

HARRY F. MANBECK, JR.

Attesting Officer

Commissioner of Patents and Trademarks